April 8, 1969
LE ROY F. MICIN
3,437,317
SHAKER
Filed May 22, 1967
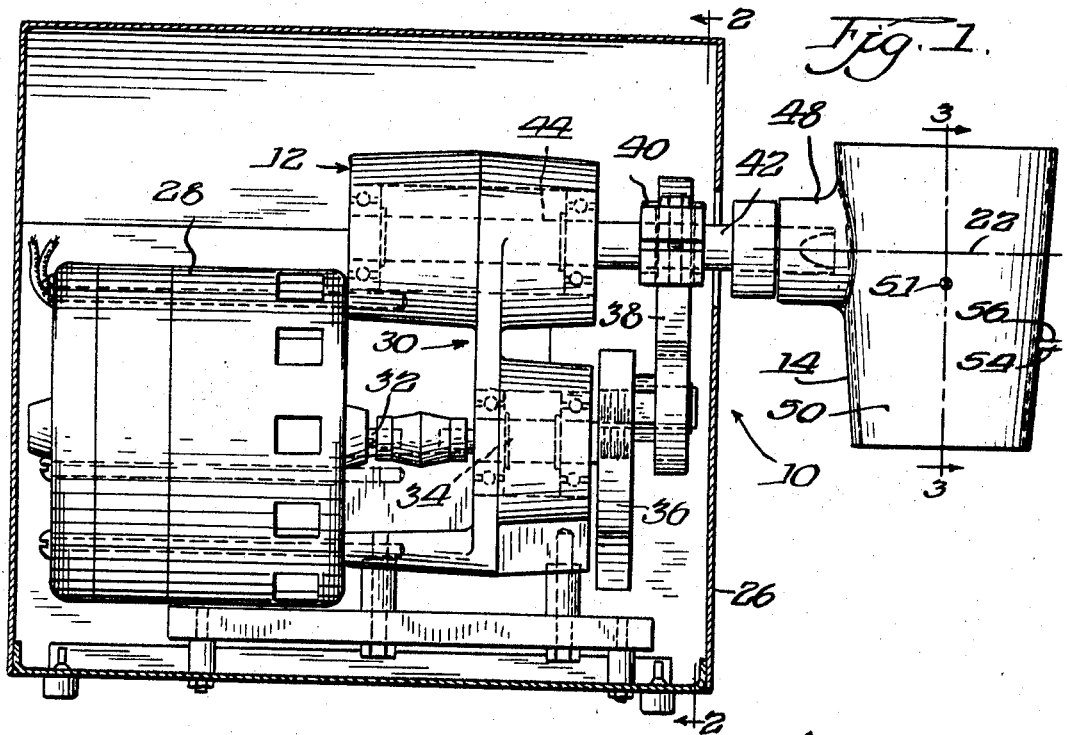
Fig. 1.
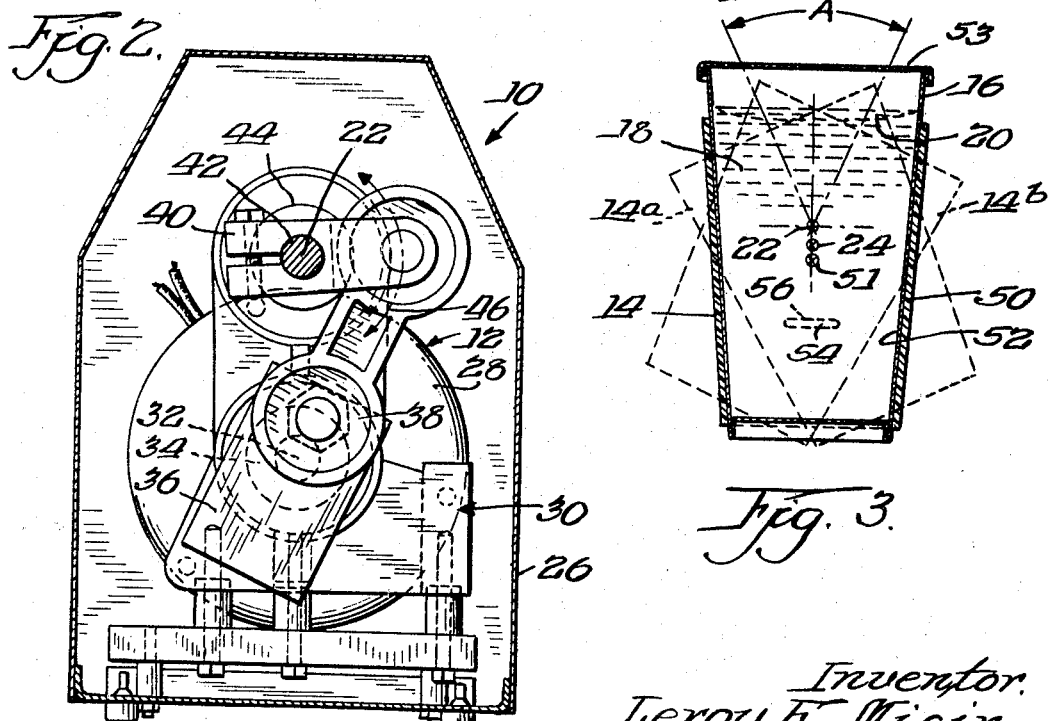
Fig. 2.
Fig. 3.
Inventor.
Leroy F. Micin.
By Hume, Clement, Hume & Lee.
Attys.

United States Patent Office 3,437,317
Patented Apr. 8, 1969

3,437,317
SHAKER
Le Roy F. Micin, 826 Sharon Drive,
Woodstock, Ill. 60098
Filed May 22, 1967, Ser. No. 640,137
Int. Cl. B01f 11/00
U.S. Cl. 259—75        9 Claims

ABSTRACT OF THE DISCLOSURE

Apparatus for mixing different materials together in a container. A sealed container rests in a container holder and oscillates about a generally horizontal axis of rotation which extends centrally through the materials in the container at or slightly above their center of mass. Mixing is accomplished solely by rapid oscillation of the cup through a limited angle of oscillation about this axis for a brief period.

*Introduction.*—*Background, summary, and brief description of the drawings*

The present invention provides a novel apparatus for the rapid and effective mixing of two liquid or powder materials in small quantities in a closed container without requiring any contact with the material. As a specific application the mixing of flavoring, such as fruits, syrups, malts, etc., into viscous semifrozen comestibles, such as soft ice cream from dispensing machines, presents particular problems. The heavy and viscous nature of the comestible product makes mixing difficult. Yet, for commercial reasons vary rapid, complete mixing is essential. Further, for sanitary reasons handling of the product must be minimized. Mixing is conventionally accomplished by rotary beaters, the blades of which must be inserted into the product and which frequently do not provide complete mixing.

The apparatus of the present invention provide rapid and complete mixing of materials directly in a container without any portion of the mixing apparatus contacting the materials, and without any contamination by previously mixed materials. The materials are mixed solely by reversibly oscillating the container about an axis of rotation extending centrally through the volume of the materials. This motion is imparted to the container by a container holder driven by an oscillating drive means. The container need not be held in place mechanically and may be rapidly and easily inserted and removed from the container holder. The apparatus is simple and compact and easy to operate and clean. The container is not subject to damage during mixing; hence, there is no requirement of mixing the comestible in a special container. For example, a conventional lightweight paper or plastic cup may be employed. The materials may be mixed without changing their overrun, i.e. the percentage of air previously mixed into the material.

Further objects, features, and advantages of the invention pertain to the particular arrangement, and structure whereby the above-mentioned aspects of the invention are attained. The invention will be better understood by reference to the following description and to the drawings forming a part thereof, which are substantially to scale, wherein:

FIGURE 1 is a side elevational view of an exemplary embodiment of the invention specifically adapted for mixing semifrozen comestibles, with the side of the housing or cover removed for visibility;

FIGURE 2 is a cross-sectional view taken along the line 2—2 of FIGURE 1; and

FIGURE 3 is a cross-sectional view taken along the line 3—3 of FIGURE 1.

*Description of the exemplary embodiments*

Referring to FIGURES 1 through 3, there is shown a mixing apparatus or shaker 10 in accordance with the present invention employing the method of the invention. The shaker 10 includes generally an oscillating drive 12 directly connected to a cup holder 14. As may be particularly seen in FIGURE 3 a conventional cup 16 of viscous semifrozen comestible 18 and flavoring 20 is carried within the cup holder 14 and is reversibly oscillated through the limited angle A. The dotted outlines 14a and 14b show the cup holder 14 at the extreme positions of its oscillation. The cup holder 14 and the cup 16 are rotated about an axis of rotation 22 extending centrally through the cup 16 and the volume of semifrozen comestible 18 preferably at or slightly above the center of mass 24 of that volume.

Referring in greater detail to the oscillating drive 12, it may be seen that the entire unit is enclosed within a housing 26. It is independent of the concern of the operator and need not be cleaned to maintain sanitary conditions. The mechanism of the oscillating drive 12 is basically conventional and accordingly need not be described herein in great detail. It is powered by a conventional electric motor 28 which may be controlled by suitable conventional switches and/or automatic controls. The motor 28 is mounted to a heavy frame 30, and the drive shaft 32 of the motor is connected through a bearing 34 in the frame 30 to rotate a counterweight block 36. The lower end of a crank arm 38 is pivotally mounted to the rotating block 36 a short distance from the axis of rotation of the drive shaft 32 and block 36 and is rotated accordingly. The upper end of the crank arm 38 is pivotally connected to the outer end of an elongated clevis 40. The inner end of the clevis 40 is clamped to an output shaft 42. This output shaft 42 is freely rotatable but axially fixed by a bearing 44 in the frame 30. The arrow 46 in FIGURE 2 illustrates the limited oscillatory movement of the outer end of the clevis 40, which movement is imparted to it by the upper end of the crank 38 and which it in turn imparts to the output shaft 42.

It may be seen that the output shaft 42 of the oscillating drive 12 extends outwardly through the housing 26 and is fixed to a socket 48 projecting from the side of the cup holder 14. Thus the cup holder 14 has imparted to it the movement of the output shaft 42. This movement is preferably a reversible circular oscillation of approximately 1,000 oscillations or cycles per minute with an angle of oscillation A of approximately 50 degrees about the axis of rotation 22. It has been found that this rate, angle and axis position of oscillation provide the most effective and rapid mixing of the flavoring 20 into the viscous semifrozen comestible 18. With these preferred conditions, complete mixing of the entire contents of the cup 16 may be accomplished in approximately only four seconds. Conducting the oscillation of the contents for a greater period of time is neither necessary nor desirable. An angle of oscillation A of less than 20 degrees or greater than 120 degrees provides substantially less effective mixing, as does an oscillation rate below 500 oscillations per minute or above 2,000 oscilaltions per minute.

It will be noted that the only movement of the cup holder 14 is a limited oscillatory rotation about the single, horizontally fixed axis of rotation 22. The movement thus imparted to the semifrozen comestible in the cup 16 thus consists of a rapid series of turbulent movements involving lateral acceleration and deceleration rather than a swirling of the comestible within the cup. An additional effect of the preferred movement, particularly with the conventionally upwardly diverging conical cup configuration, is a vertical circulation of the contents. Thus, complete lateral and vertical mixing is provided.

The following table illustrates the preferred sizes of the cup 16 and the weight of the semifrozen comestible contents 18 thereof based on a weight for the initial liquid ingredient or mix of 144 ounces per gallon. The "overrun" is the measure of the percentage of air to mix in the semifrozen comestible.

| Size of container in fluid ounces | Overrun (oz.) | | | |
|---|---|---|---|---|
|  | 30% | 40% | 50% | 60% |
| 12 | 10.39 | 9.65 | 9.00 | 8.44 |
| 14 | 12.12 | 11.25 | 10.50 | 9.85 |
| 16 | 13.85 | 12.86 | 12.00 | 11.25 |

Considering in detail the structure of the cup holder 14, it is preferably constructed as an integral molding of plastic or other suitable sanitary material. The preferred construction is basically that of a uniform upwardly diverging cone shell truncated by horizontal planes at both its upper and lower ends and concentric about a vertical axis. It is defined solely by a thin uniform thickness wall 50 to which the socket 48 is attached at right angles near the upper end thereof. The interior of the wall 50 is designed to uniformly, smoothly and evenly abut the principal portion of the wall 52 of the cup 16, thus completely supporting and protecting the wall 52 during the shaking operation. Accordingly, the conical taper of the interior of the wall 50 is the same as that of the cup 16. It may be seen that the cup 16 is readily insertable and removable from the open upper end of the cup holder 14. Preferably the lower end of the cup 16 projects slightly below the lower end of the cup holder 14 to assist in its removal.

It may be seen that the axis of rotation 22 extends centrally through the cup holder 14, passing through the vertical center line of the cup holder and generally through the approximate center of volume 51 of the cup holder, or approximately ⅓ of the vertical extent of the cup holder from the top thereof for the taper shown.

There is preferably provided a tab 54 projecting horizontally outwardly from the front of the cup holder 14 adjacent and spaced slightly above the open lower end of the cup holder. This tab 54 provides a thumb grasping surface 56 on its upper surface for ease of removal of the cup 16 from the cup holder 14.

A conventional cover or cap 53 is preferably fastened or snapped over the top of the cup 16. Such caps 53 are of plastic or other suitable construction and are conventionally provided to sanitarily cover the ingredients of the cup 16 and to prevent spilling during the handling or transportation of the comestible. In the present invention, the preattachment of the cap 53 prior to the mixing operation is desirable to prevent splashing of the ingredients from the cup during the mixing operation. The fact that the mixing may be accomplished with the cap 53 in place is advantageous for handling by the operator and from a sanitary standpoint. If desired, additional means may be provided for assisting in retaining the cap 53 upon the cup 16 during the mixing operation.

Considering now the operation of the shaker 10 and the mixing of flavoring into the semifrozen comestible from the standpoint of the operator, the operator first fills a conventional dispensing cup 16 with the comestible 18 in the usual manner. The flavoring 20 may then be inserted into the cup 16 in a conventional manner. The cap 53 is then secured over the top of the cup 16.

To insert the cup 16 into the shaker, it need only be vertically dropped into the cup holder 14. The cup 16 automatically drops into the exact position desired in the cup holder 14. No fastening means of any kind are required or desired. The oscillating drive 12 may then be turned on for the requisite desired period, and rapid and complete mixing occurs under the conditions described above.

Although rapid agitation of the comestible product in the cup 16 occurs, the above-described relationship of the axis of rotation 22 to the cup 16 and to the comestible therein and the conditions of the oscillation are such that there is no tendency for the cup 16 to fly out of the cup holder 14. The cup 16 is removably retained in the cup holder 14 solely by gravity and centrifugal force, yet large centrifugal forces are prevented so that the cup 16 cannot wedge or bind in the cup holder 14 and so that heavy pressure is not exerted against the bottom of the cup 16 by the contents. The walls 52 of the cup are fully protected and supported during the shaking process as described above.

Removal of the cup 16 from the cup holder 14 after mixing is completed is rapidly and easily accomplished by the operator with one hand. The operator may place his thumb on the surface 56 of the tab 54 and his fingers on the bottom of the cup and press upwardly with his fingers on the bottom of the cup 16. The top of the removed cup may then be grasped by the operator's other hand, and the cup may then be transferred directly to the customer or placed in refrigerated storage in a conventional manner.

It may be seen that there has been described herein a novel apparatus for mixing two materials together, which are extremely rapid, simple and economical and completely sanitary. It will also be appreciated that, while the exemplary embodiments described herein relate to semifrozen comestibles, the apparatus of the invention is applicable to numerous other fields including the mixing of drugs, chemicals, etc. Other comestible products advantageously mixed in accordance with the invention include hot chocolate and marshmallow syrup, pancake mixes, etc.

The apparatus described herein is presently considered to be preferred; however, it is contemplated that further variations and modifications are within the purview of those skilled in the art. The following claims are intended to cover all such variations and modifications as fall within the true spirit and scope of the invention.

What is claimed is:
1. A mixing apparatus for mixing a plurality of materials together, comprising:
   container holder means,
   oscillating drive means connected to said container holder means for rapidly oscillating said container holder means only about a single generally horizontal axis of rotation extending through said container holder,
   said container holder means being adapted to hold a container of materials with said axis of rotation extending centrally through the container adjacent the center of volume of the container,
   and said container holder means being adapted to removably retain the container therein solely by gravity and centrifugal force.

2. The mixing apparatus of claim 1 wherein said drive means oscillates said container holder means at a rate of between 500 and 2,000 oscillations per minute through an angle of oscillation greater than 20 degrees and less than 120 degrees.

3. A mixing apparatus for mixing a plurality of materials together, comprising:
   container holder means,
   oscillating drive means connected to said container holder means for rapidly oscillating said container holder means only about a single generally horizontal axis of rotation extending through said container holder,
   said container holder means being adapted to hold a container of materials with said axis of rotation extending centrally through the container adjacent the center of volume of the container,
   and said container holder means having an upwardly diverging interior surface with an open upper end into which the container is insertable.

4. The mixing apparatus of claim 3 wherein said container holder means is adapted to removably retain the container therein solely by gravity and centrifugal force.

5. The mixing apparatus of claim 3 wherein said drive means oscillates said container holder means at a rate of between 500 and 2,000 oscillations per minute through an angle of oscillation greater than 20 degrees and less than 120 degrees.

6. The mixing apparatus of claim 3 wherein said container holder means has an open lower end and an outwardly projecting finger grasping surface adjacent said lower end.

7. A mixing apparatus for mixing a plurality of materials together, comprising:
   container holder means,
   oscillating drive means connected to said container holder means for rapidly oscillating said container holder means only about a single generally horizontal axis of rotation extending through said container holder,
   said container holder means being adapted to hold a container of materials with said axis of rotation extending centrally through the container adjacent the center of volume of the container,
   said container holder means having an upwardly diverging smooth conical interior supporting surface adapted to evenly abut and support the sides of a correspondingly conical container.

8. The mixing apparatus of claim 7 wherein said container holder means is adapted to removably retain the container therein solely by gravity and centrifugal force.

9. The mixing apparatus of claim 7 wherein said oscillating drive means is adapted to oscillate said container holder means at approximately 1,000 oscillations per minute through an angle of oscillation of approximately 50 degrees.

References Cited

UNITED STATES PATENTS

| | | | |
|---|---|---|---|
| 2,717,700 | 9/1955 | Gruzensky | 259—75 X |
| 3,074,696 | 1/1963 | Elm | 259—75 |
| 3,265,366 | 8/1966 | Warner | 259—56 |

ROBERT W. JENKINS, *Primary Examiner.*